Aug. 2, 1949.　　　　　E. E. WALLACE　　　　　2,478,068
OPERATING MEANS FOR MOVABLE MEMBERS
OF AIRPLANES OR OTHER APPARATUS
Filed Aug. 24, 1942　　　　　　　　　　　　5 Sheets-Sheet 1

INVENTOR.
Edward E. Wallace
BY Geo. B. Pitts
Attorney

Aug. 2, 1949.

E. E. WALLACE

2,478,068

OPERATING MEANS FOR MOVABLE MEMBERS
OF AIRPLANES OR OTHER APPARATUS

Filed Aug. 24, 1942

INVENTOR.
Edward E. Wallace
BY Geo. B. Pitts
Attorney

Aug. 2, 1949.　　　　　E. E. WALLACE　　　　　2,478,068
OPERATING MEANS FOR MOVABLE MEMBERS
OF AIRPLANES OR OTHER APPARATUS
Filed Aug. 24, 1942　　　　　　　　　　　　　5 Sheets-Sheet 5

INVENTOR.
Edward E. Wallace
BY
Geo. B. Pitts
attorney

Patented Aug. 2, 1949

2,478,068

UNITED STATES PATENT OFFICE 2,478,068

OPERATING MEANS FOR MOVABLE MEMBERS OF AIRPLANES OR OTHER APPARATUS

Edward E. Wallace, Cleveland Heights, Ohio; Daisy T. Wallace administratrix of said Edward E. Wallace, deceased Application August 24, 1942, Serial No. 455,894

16 Claims. (Cl. 121—41)

This invention relates to means for operating and controlling a movable member or members to and from one or more positions, each such operation and control being effected in a simple manner by a single manual operation. The invention may be employed to operate the load carrying or handling device in excavating, hoisting and conveying apparatus, elevators to and from various stations, machine tool equipment where the operation of a movable part is to be controlled; likewise the invention may be employed to operate and control one or more movable parts of a vehicle, for example, parts of an airplane, such as the rudder, the elevators, the landing gears, the flaps, or the ailerons and any other movable equipment which may be provided on the airplane. The invention also relates to an airplane, whereby flying, maneuvering and landing thereof are facilitated, and control of the airplane under abnormal conditions may be maintained to avoid possible undue damage.

In one application of the invention, as shown in Figs. 1 to 16, inclusive, the means embodying my invention are illustrated connected to the flaps of an airplane, whereby the pilot may operate both or either one thereof from their normal position upwardly or downwardly. Accordingly, in this application of the invention I provide a controlling mechanism for each flap, but mount the hand operated devices therefor in side by side relation in the cock-pit, whereby they may be operated separately or connected together for simultaneous movement in a ready manner.

One object of the invention is to provide an improved airplane the wings of which are provided with flaps mounted thereon to swing upwardly and downwardly.

Another object of the invention is to provide an improved airplane the wings of which are provided with ailerons and flaps arranged to move downwardly and upwardly relative to the wings of the airplane, whereby the flaps may be operated to function as ailerons or serve to stabilize the airplane where a wing or a portion thereof becomes useless.

Another object of the invention is to provide for a movable member an improved operating and controlling mechanism therefor having fluid operated devices, which are electrically controlled.

Another object of the invention is to provide for the movable member of an airplane an improved fluid operated mechanism, wherein means are provided for controlling the travel of the piston of such mechanism any desired distance, whereby the movable member of an airplane may be moved to and held in any predetermined position within the range of movement thereof.

Another object of the invention is to provide improved mechanisms for operating movable members of an airplane, arranged to be interconnected whereby both members may be simultaneously controlled.

Another object of the invention is to provide in an airplane having a movable member operated by fluid under pressure, the fluid control valve of which is normally held in closed position, improved mechanism for controlling the movement of the valve to open and closed positions to move the movable member of the airplane in either direction to any predetermined position.

Another object of the invention is to provide in an airplane having a member movable to different selective positions, an improved operating mechanism having a manually operated selector and arranged to automatically move said member to and from successive selected positions, in co-ordinated relation to the movement of the selector.

A further object of the invention is to provide for the movable member of an airplane an improved operating mechanism comprising a fluid operated means connected to said member, a selector, and electrical control means between the selector and fluid supply for said fluid operated means, provision being made to open the circuits for said electrical control means when the movable member is at rest.

Other objects of the invention will be apparent to those skilled in the art to which my invention relates from the following description taken in connection with the accompanying drawings, wherein

Fig. 3c is a fragmentary view, partly in section on the line 3c—3c of Fig. 5, of certain details.

Fig. 3d is a section on the line 3d—3d of Fig. 3c, enlarged.

In the drawings, 1 indicates as an entirety an airplane which may be of any desired construction. I have illustrated an airplane of the sesqui amphibian type, the sponsons 2 of which (see dotted lines in Fig. 1) are provided with landing gears 3 shown in dotted lines in non-operating position. The illustrated construction of airplane is provided with suitable motors (not shown) driving propellers 4. The number and arrangement of propellers form no part of the present invention. The airplane comprises a fuselage 5 providing a cock-pit 5a, wings 6, flaps 6', ailerons 7, a rudder 8 and elevators 9. The parts referred to may be of any desired construction, and each of those which are movable may be connected to and operated by mechanism such as hereinafter set forth, although for the purpose of showing one application of the invention the flaps 6' only are shown so connected and operated. As the mechanisms for operating the flaps 6', 6', are similar in construction, only one complete mechanism and the lever and parts of the indexing means for the other mechanism are illustrated.

Figures 1, 9, 10, 11, 13, 15, 25:
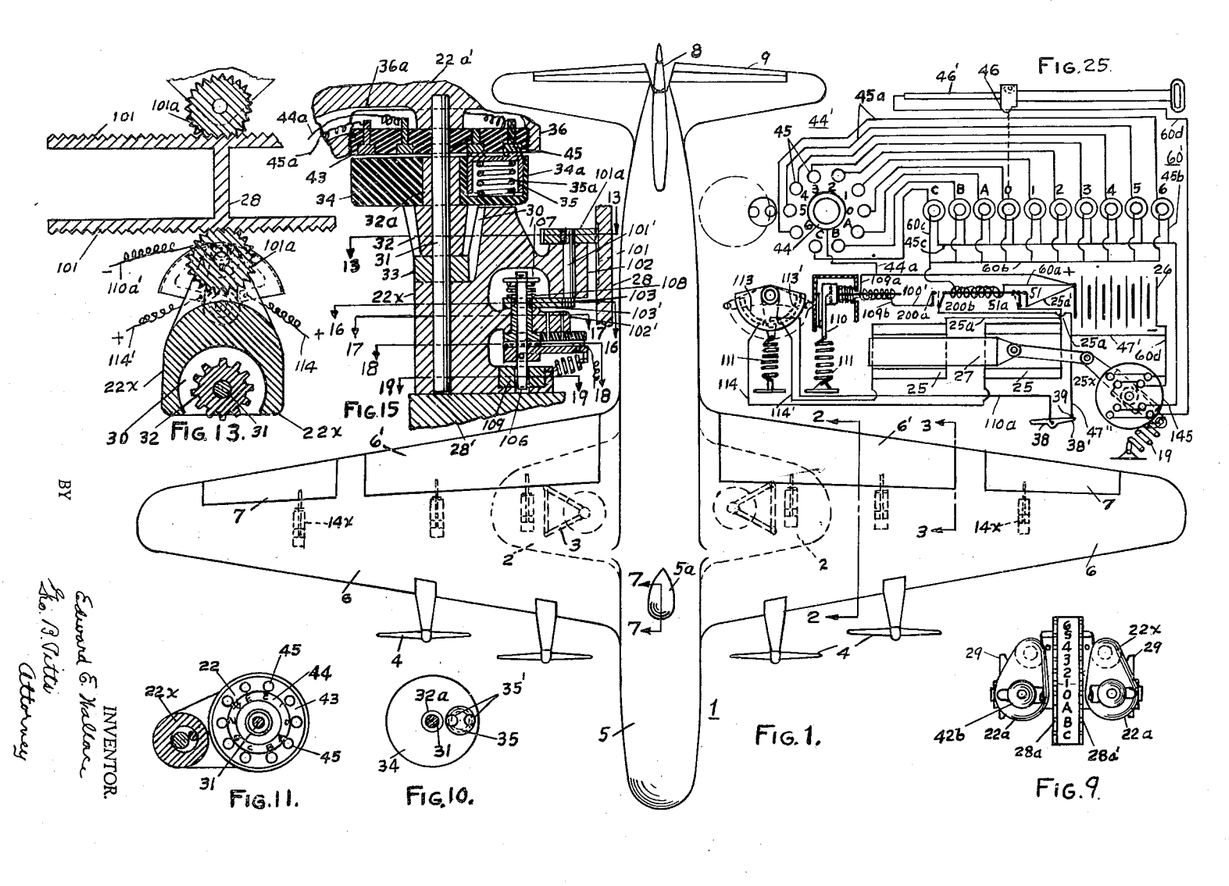
Fig. 1 is a plan view of an airplane embodying my invention.
Fig. 9 is a fragmentary plan view on the line 9—9 of Fig. 7.
Figs. 10, 11 and 12 are sections on the lines 10—10, 11—11 and 12—12, respectively, of Fig. 7.
Fig. 13 is a fragmentary section on the line 13—13 of Figs. 8, 15 and 15a, enlarged.
Fig. 15 is a fragmentary sectional view on the line 15—15 of Fig. 7.
Fig. 25 is a diagrammatic view.
Figures 2, 3A, 3B, 14, 20, 21, 22, 23, 24:
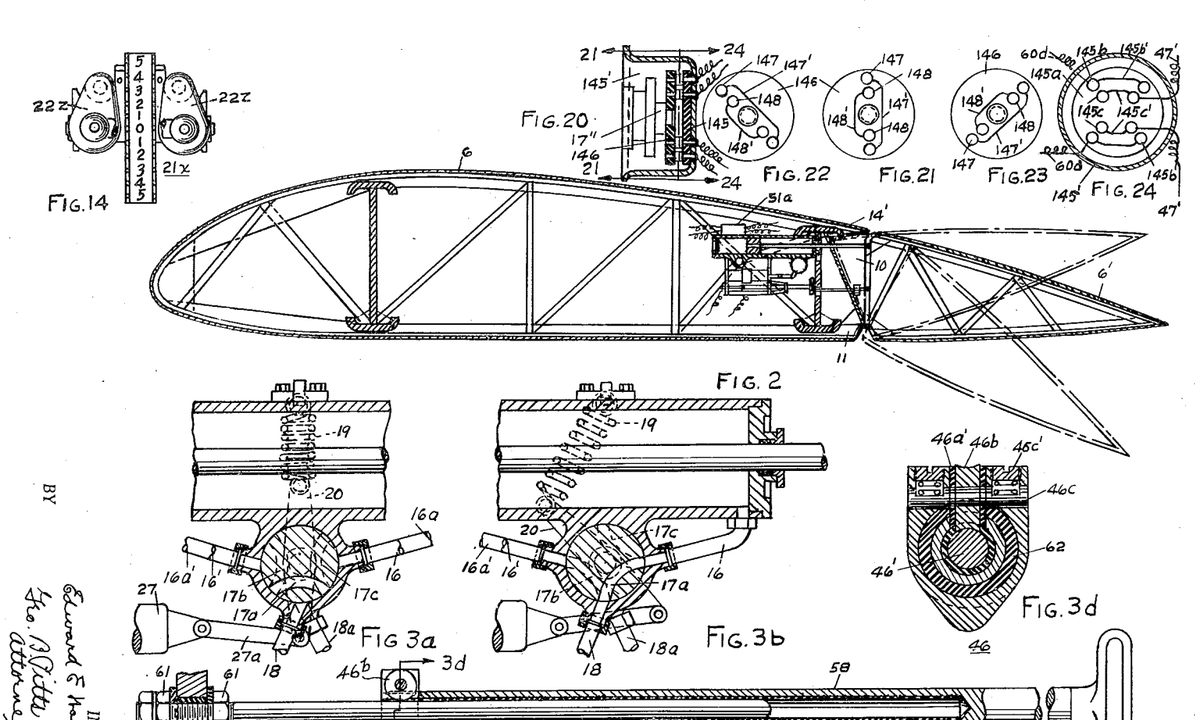
Fig. 2 is a section on the line 2—2 of Fig. 1, enlarged.
Fig. 3a is a fragmentary section showing the fluid control valve in closed position.
Fig. 3b is a view similar to Fig. 3a, but showing the fluid control valve in its other open position.
Fig. 14 is a fragmentary plan view on the line 14—14 of Fig. 13.
Fig. 20 is a section on the line 20—20 of Fig. 4.
Fig. 21 is a section on the line 21—21 of Fig. 20.
Figs. 22 and 23 are views similar to Fig. 20, but showing the part in different positions.
Fig. 24 is a section on the line 24—24 of Fig. 20.

Fig. 2 shows in cross section one wing 6 provided on its rear or trailing edge with a recess or chamber 10. The inner side wall 10a of the recess extends from spaced struts 11 (one only being shown), adjacent the lower or bottom wall of the wing 6, upwardly and inwardly; the upper end of the wall is bent outwardly and suitably connected to the upper wall of the wing. The wall 10a and end walls 10b of the chamber 10 close the wing against intake of dirt and the elements. The struts 11 are provided with suitable bearings for a shaft 12 on which the adjacent flap 6' swings. The flap 6' is normally held in the position shown in Figs. 1, 2 and 3, but may be swung upwardly and downwardly as shown in dotted lines in Fig. 2, for control of the airplane, the chamber 10 accommodating the inner end of the flap when the latter is swung upwardly. Below the struts 11, the opposed walls of the wing 6 and flap 6' are relieved, as shown at 13, 13a, respectively, to permit the flap to swing downwardly as shown in dotted lines in Fig. 2.

The flap 6' is operated by a fluid, such as oil, under pressure by means of a piston 14 connected by a pitman 14' with the adjacent flap 6', and slidable in a cylinder 14a, which is preferably pivoted on a shaft 15, the latter being suitably supported on brackets 16 (one only being shown) carried by the struts of the wing structure. The inner end of the cylinder 14a has connected to its two pipes 16, 16a, and its outer end has connected to it two pipes 16', 16a', the flow of the fluid through each pipe to and from the adjacent end of the cylinder 14a being controlled by a valve indicated as an entirety at 17. Due to the fact that the flap 6' is to be held in normal position and also moved to and held at varying angles, as well as at the extreme limit of its movement in either direction, provision is made for supplying to each end of the cylinder 14a through one pipe fluid under high pressure (approximately 100 lbs. for example) and through the other pipe fluid under a lower pressure (approximately 10 lbs. for example), the valve 17 serving to supply the fluid under high pressure to one side of the piston 14 and simultaneously connect the low pressure fluid supply with the other end of the cylinder 14a dependent upon the direction in which the piston 14 is to be moved. 18 indicates a pipe leading from a source of fluid supply under high pressure and 18a indicates a pipe leading from a source of fluid supply under low pressure, both pipes being connected to the valve casing in a well known manner. The valve element 17' of the valve 17 is normally held in closed position (see Fig. 3a) by a coiled spring 19, which is put under tension when the valve element is moved in either direction (see Figs. 3 and 3b), the spring 19 being connected at one end to an arm 20 fixed to the shank of the valve element 17' and its opposite end being anchored on a bracket 19a suitably secured to the wall of the cylinder 14a (see Fig. 5). The valve element 17' is provided with three ducts 17a, 17b, 17c, arranged to close the fluid supply from pipe 18 and fluid discharge through pipe 18a, but when the valve element 17' is moved to the Fig. 3 position the duct 17a registers with the pipes 18 and 16' and the duct 17c registers with the pipe 16a and pipe 18a (pipes 16 and 16a' being closed by the valve element 17') and when the valve element 17' is moved to the Fig. 3b position the duct 17a registers with the pipes 18 and 16 and the duct 17b registers with the pipes 16a' and 18a, (pipes 16' and 16a being closed by the valve element 17') ports being provided in the valve casing to permit of the respective fluid connections.

Means indicated as an entirety at 21 are provided for operating the valve element 17' in either direction, these operating means being connected in by the operation of a lever 22a forming part of an indexing mechanism, indicated as an entirety at 22, and valve releasing means, indicated as an entirety at 21', controlled by the flap 6' are provided, so that when the piston 14 has moved a predetermined distance, according to the operation of the indexing mechanism 22, to swing the adjacent flap 6' to the desired angle, the valve 17 is automatically closed, to cut off the supply of high pressure fluid to one end of the cylinder and stop discharge of the fluid from the opposite end of the cylinder to the low pressure supply pipe 18a, the effect of which is to hold or lock the piston at the position where cut-off takes place and prevent its movement in either direction due to the fluid in the cylinder 14a on both sides of the piston 14 and accordingly rigidly support the flap 6' in normal position or at the desired angle to the wing 6.

Figures 7, 8, 12:
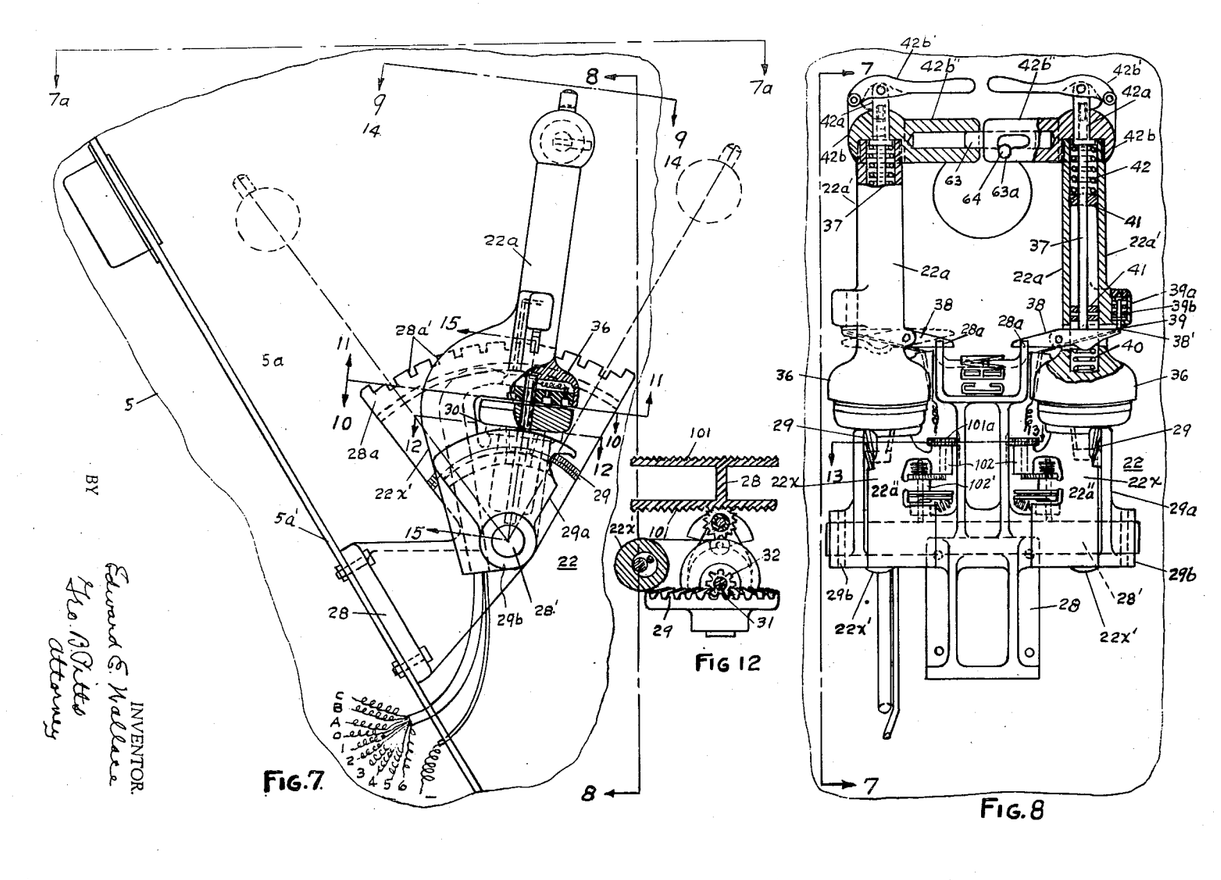
Fig. 7 is a fragmentary elevation of a portion of the cock-pit showing the position of the control devices or levers in convenient position for the pilot, parts being broken away; this view being enlarged and taken on the line 7—7 of Figs. 1 and 8.
Fig. 8 is a view of the line 8—8 of Fig. 7, partly in elevation and partly in section.
Figure 16:
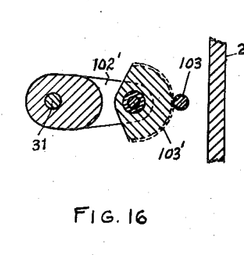
Figs. 16, 17 and 18 are sections on the lines 16—16, 17—17 and 18—18, respectively, of Fig. 15.

The operating means 21 comprise the following: 23 indicates a frame consisting of side bars 23a and a cross bar 23b at their lower ends. As shown, the side bars 23a are connected (as by welds) at their upper ends to the wall of the cylinder 14a, whereby the frame 23 swings with the cylinder about the pivot 15. The cross bar 23b is formed with a plurality of recesses, each supporting a solenoid 23x one for the neutral position of the indexing mechanism 22 and one for each indexing position A, B, C, and 1, 2, 3, 4, 5, 6, thereof. The solenoids 23x form part of the releasing means 21'. The core 23x' of each solenoid (when its coil is energized) is raised to serve as a contact to close a circuit, as later set forth. Each core is normally biased downwardly by a spring 23y, such movement being limited by a pin 23y' engaging the bar 23b. 24 indicates as an entirety a double acting solenoid supported by the frame 23. For this purpose, the side bars 23a of the frame are provided with lateral extensions 23a' (see Fig. 5) formed with alined openings which form seats for the solenoid 24. The solenoid 24 consists of the following: 24' indicates axially related tubular members formed of insulating material, their outer ends being seated in the openings in the extensions 23a' and their inner ends being threaded into and secured together by a ring nut 24a. Each tubular member 24' is provided at its opposite ends with flanges and between the flanges each tubular member supports a coil 25 connected in a circuit 25x which is supplied with current from a battery 26 (see Fig. 25), as later set forth. The inner walls of the tubular members slidably support a core 27, which is connected by a link 27a to an arm 20a fixed to the shank of the valve element 17', so that by energizing either coil 25 the core may be moved from its normal position in either direction. When the lever 22a of the indexing mechanism 22 is in neutral position, as shown in Fig 7, or in any indexing position following the movement of the flap to any predetermined position, both coils are de-energized, but when the lever 22a is operated in either direction one of the coils 25 is energized and then de-energized, as later set forth, according to the position to which the lever 22a has been moved.

The indexing mechanism 22 comprises the following: 28 indicates a bracket mounted on the instrument board 5a' in the cock-pit 5a and fixedly supporting a shaft 28', the opposite end portions of which form the pivots on which the levers 22a for the two indexing mechanisms 22 swing independently or together, as later set forth. 29 indicates arc shaped racks each provided on a plate 29a, which is provided with a hollow boss 29b fixed to the adjacent outer end of the shaft 28'. The purpose of the racks will later be set forth. The bracket 28 extends upwardly between the levers 22a and is provided with spaced arc shaped flanges 28a each formed with a plurality of notches 28a' one corresponding to the neutral position of the adjacent lever 22a and one corresponding to each indexing position. By preference each notch 28a' is one flange alines with one of the notches of the other flange, and each two alined notches correspond to the same indexing position of the two indexing mechanisms, as will be observed in Fig. 9. As shown in Figs. 8 and 9, the wall of the bracket between the flanges 28a carries indicia indicating the alined notches.

Each lever 22a consists of an upper portion 22a' and a lower portion 22a'' connected together at one side by an intermediate wall 22x shaped to form a recess 30 and a guard 22x' (see Fig. 7) for leads to be later referred to. A rod 31 is supported in the upper and lower portions of the lever and extends through the recess 30 to serve as a shaft for a bevel pinion 32, in mesh with the adjacent rack 29, whereby swinging movement of the lever 22a will serve to rotate the pinion 32. The lower end of the pinion 32 rests on a bearing disk or collar 33 whereas its upper end is provided with a hub 32a which fits into and is keyed to a disk 34 (which is formed of suitable insulating material) to effect rotation of the latter in the recess 30. At one side the disk 34 is formed with a recess 34a in which is movably mounted an inverted metallic cup-shaped contact member 35 normally pressed upwardly by a light coiled spring 35a interposed between its bottom wall and the bottom wall of the recess 34a. The upper surface of the bottom wall of the contact member 35 is provided with spaced contact devices 35' (see Fig. 10) for a purpose later set forth. The upper lever portion 22a' is shaped to form a head 36 on its lower end. Above the head 36 the lever portion 22a' is hollow to enclose a plunger 37, which at its lower or inner end engages a trigger 38 and swings it about its pivot when operated downwardly. The trigger 38 is pivoted to the inner side of the lever 22a and extends through alined slots formed in the hollow walls of the lever portion 22a'. The nose of the trigger 38 is arranged to seat into any one of the adjacent notches 28a' dependent upon the movement of the lever 22a. The tail of the trigger is provided with a contact 38' (suitably insulated from the trigger) arranged when the trigger is seated in a notch 28a' to engage a contact 39, the contacts 38', 39, serving as a switch to close the main circuit 25x, but to open said circuit during movement of the lever when the trigger is disengaged or removed from one notch and until it is reseated in another notch, thereby preventing operation of the core 27 and opening of the valve 17 until the indexing operation is completed. The tail end of the trigger is normally biased upwardly by a spring 40 to insure closing of the contacts 38', 39, when the trigger is seated in a notch 28a'. The plunger 37 is slidably supported by a pair of spaced collars 41 mounted in the hollow section of the lever portion 22a', a coiled spring 42 being preferably interposed between the upper collar 41 and a head 42a threaded on the upper end of the plunger and slidably mounted in a grip device 42b fixed to the upper end of the lever 22a, to normally bias the plunger upwardly and permit action of the spring 40 to operate the trigger 38. As shown, a collar on the head 42a is arranged to engage the grip device to limit the upward movement of the plunger 37. The grip device 42b is provided with a lever 42b' pivoted thereon and engaging the upper end of the head 42a (being preferably pivotally connected to the latter) so that when the grip device is grasped by the pilot to swing the lever 22a in either direction, simultaneous operation of the lever 42b' may be effected to move the plunger 37 downwardly. The contact 39 is mounted in a casing 39a provided on the outer side of the lever portion 22a' and projects through an opening in the bottom wall thereof. A coiled spring 39b between the upper removable wall of the casing 39a and a collar on the contact normally tends to move the latter toward the bottom wall of the casing, which wall limits the outward movement of the contact 39 when the trigger 36 disengages the latter, but permits the contact to move inwardly when engaged by the trigger.

The head 36 is recessed at 36a (see Figs. 7 and 15) to removably receive and support a disk 43, which is formed of insulation material, in opposed relation to the disk 34. The disk 43 preferably has screw threaded engagement with the inner side walls of the recess, 36a, as shown in Fig. 15. Embedded in the lower face of the disk 43 is an annulus 44 (see Fig. 11), formed of conducting material, in concentric relation to the rod 31 and arranged to be engaged by the inner contact device 35'. The annulus 44 is connected to a lead 44a, of a secondary circuit 44', the lead being connected to one side of the battery 26. Also embedded in the lower face of the disk and in concentric relation to the annulus 44 is a series of uniformly spaced contacts 45 (see Fig. 11) arranged to be engaged by the outer contact device 35'. Each contact 45 is connected by a lead 45a to one side of the coil for one of the solenoids 23x (see Fig. 6), the opposite side of the solenoid coil being connected by leads 45b, 45c, to complete the secondary circuit 44' to the opposite side of the battery 26; there being one contact 45 for the zero or neutral position of the lever 22a and one contact 45 for each indexing position. As will be understood from Figs. 10, 11, 15 and 25, the annulus 44 and contacts 45 are so related that in any position of the lever 22a, the devices 35' on the contact member 35 will contact the annulus 44 and one of the contacts 45 to electrically connect them and upon operation of the valve element 17' the secondary circuit will be closed through one of the solenoids 23x, the effect of which is to raise the adjacent core 23x', of the solenoid in position for engagement by a contact device 46 (to which reference will later be made) forming part of the valve releasing means 21'. Connected in the lead 46c of the secondary circuit 44' are switch devices 145 (later referred to) operated by the valve element 17', so that when the valve 17 is closed, this circuit is broken and when the valve element is moved in either direction to open position the circuit is closed through these devices. Accordingly, the devices 145, following the operation of the valve release means 21', as later set forth, will open the secondary circuit 44', the effect of which is to de-energize the coil of the solenoid 23x and thereby de-energize the coil of a solenoid 51a, to permit closing of a normally closed switch 51 and restoring of the main circuit 25x therethrough, as later set forth, and to eliminate drain on the battery 26 following each operation of the flap 6' and during periods when the flap is held in its normal or any operated position.

From the foregoing description it will be observed that when the lever 22a is operated from neutral position in either direction or from any indexing position to neutral position or another indexing position, that the disk 34, due to engagement of the pinion 32 with the stationary rack 29, will be rotated to move the outer contact 35' into engagement with the contact 45 corresponding to the selected indexing position to close the circuit 44' therethrough. In carrying out each operation of the lever 22a, the trigger 38 is disengaged from one notch 28a' by the plunger 37 and held in such position until the lever is moved to the selected indexing position, whereupon the trigger is released and allowed to drop into the adjacent notch. As the spacing between the contacts 45 is greater than the diameter or width of the contact devices 35', it will be noted that the circuit 44' is open during the indexing operation. Also, as already set forth, as the operation of the trigger serves to disengage the contact 38' from the contact 39, no current flows to and through either coil 25 of the solenoid 24 during movement of the disk 34 from one position to another position due to swinging movement of the lever 22a.

The control of the main circuit 25x through either coil 25 is effected through a make-and-break mechanism, indicated as an entirety at 100, arranged between the bracket 28 and lever 22a, by the movement of the latter from one position (neutral or an indexing position) to another position, whereby the direction of movement of the core 27 will be co-ordinated with the direction of movement of the lever in moving from neutral to any indexing position, or from the latter position to neutral or another indexing position. Of the make-and-break mechanism 100, 101 indicates a rack provided on the bracket 28 and engaged by a pinion 101a. The pinion 101a is fixed to the upper end of a shaft 101' suitably mounted in an arm 102 extending laterally from the lever wall 22x. At its lower end the shaft 101' is provided with a gear 103 which is in mesh with a gear segment 103'. The gear segment 103' is suitably keyed to the upper end of a sleeve 104, which is rotatably mounted in a separate arm 102' extending laterally from the lever wall 22x, and carries at its lower end a clutch member 105, which co-operates with the gear segment 103' to prevent endwise movement of the sleeve 104. Slidably and rotatably mounted in the sleeve 104 is a steel rod 106 provided on its upper end with a collar 107 between which and the gear segment 103' is a coiled spring 108 normally tending to slide the rod 106 endwise upwardly. The lower end of the rod 106 extends into and through a coil 109, such end of the rod serving as a core, so that when the coil 109 is energized the rod 106 will be moved downwardly against the tension of the spring 108. The coil 109 is connected to leads 109a, 109b, of an auxiliary circuit, which is closed in the manner later set forth. 110 indicates an arm suitably fixed to the rod 106 above the coil 109, the hub of the arm being provided with clutch elements 110' (see Figs. 18, 18a and 18b) to form a clutch member arranged to engage and disengage the clutch member 105. That is, when the coil 109 is deenergized, the spring 108 will maintain the clutch member 110' in engagement with the clutch member 105, whereby rotation of the latter will swing the arm 110 about the axis of the rod 106 (see Figs. 18a and 18b), but upon energization of the coil 109, the clutch member 110' will disengage the clutch member 105 and permit the arm 110 to swing to its normal or mid-position (see Fig. 18) under the influence of a spring 111. As shown in Figs. 15, 15a, 18, 18a, 18b, the spring 111 is suitably connected at its inner end to the lever wall 22a'' and at its outer end to the outer end of the arm 110.

Figures 3, 4, 5, 6:
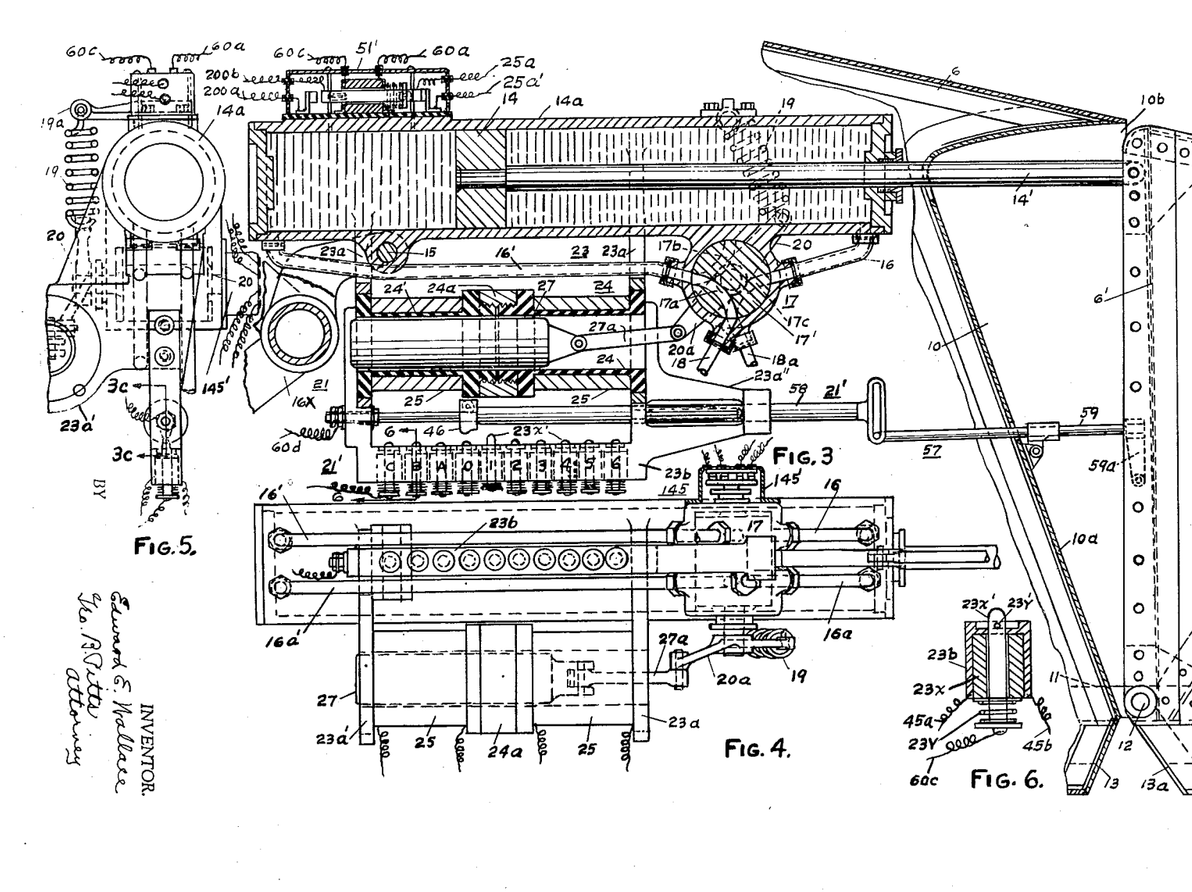
Fig. 3 is a fragmentary view of parts shown in Fig. 2, enlarged, showing the fluid control valve in one open position, and being a section on the line 3—3 of Fig. 1.
Fig. 4 is a bottom plan view of parts shown in Fig. 3.
Fig. 5 is an end elevation of parts shown in Figs. 3 and 4.
Fig. 6 is a section on the line 6—6 of Fig. 3, enlarged.
Figures 3E, 7A, 8A, 8B, 15A, 18A, 18B:
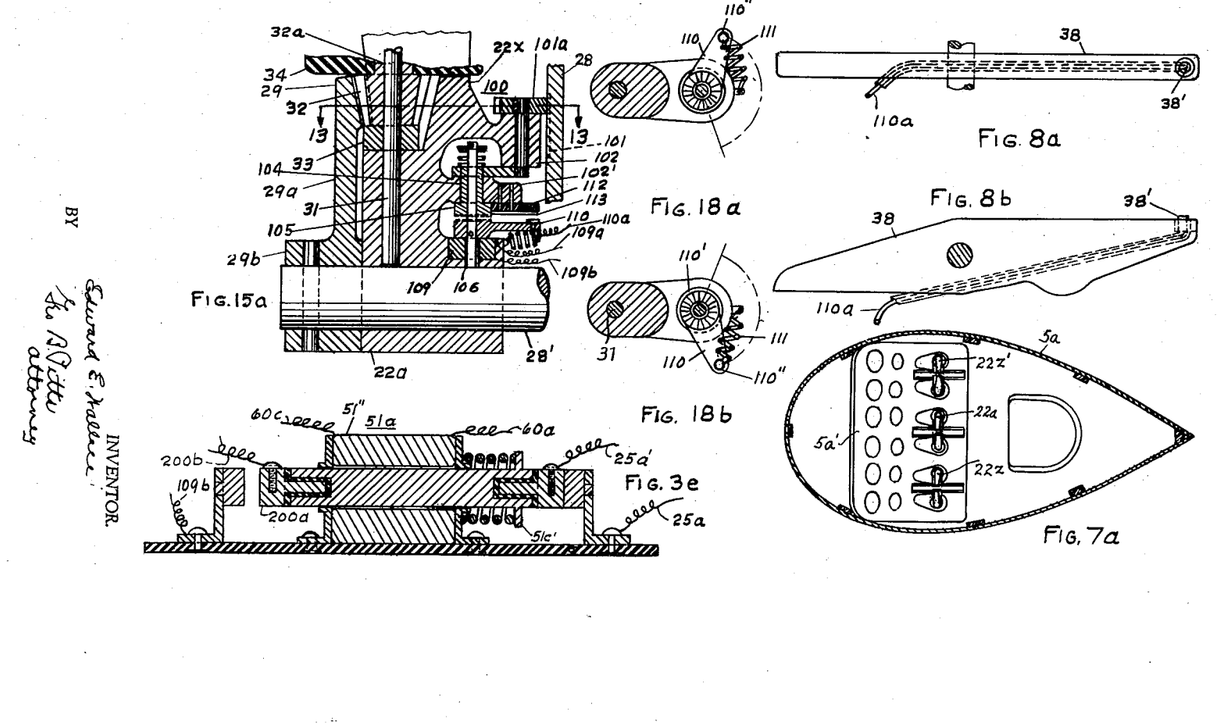
Fig. 3e is a fragmentary section of parts shown in Fig. 3, enlarged.
Fig. 7a is a section through the side walls of the cock-pit showing in plan the control levers on the line 7a—7a of Fig. 7.
Figs. 8a and 8b are plan and side elevational views, respectively, of the trigger for opening and closing the main circuit.
Fig. 15a is a fragmentary view similar to Fig. 15, somewhat enlarged.
Figs. 18a and 18b are views similar to Fig. 18, but showing the arm in its operated positions.
Figure 17:
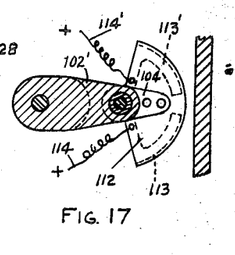
Figure 18:
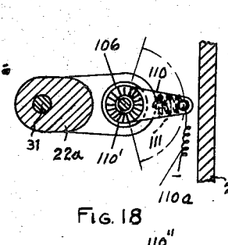
Figure 19:
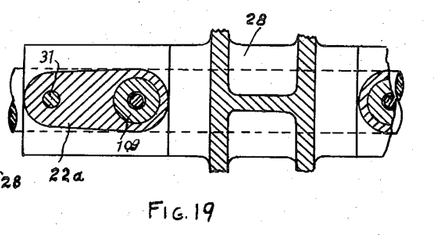
Fig. 19 is a section on the line 19—19 of Fig. 15.

From the foregoing description it will be observed that when the lever 22a is swung toward the left, as viewed in Fig. 7, the arm 110 will swing counter-clockwise (see Fig. 18a) and movement of the lever 22a toward the right will swing the arm 110 clockwise (see Fig. 18b). The upper face of the arm 110, adjacent its outer end is provided with a contact 110'' (the purpose of which will later appear) connected to a lead 110a, forming part of the main circuit 25x. 112 indicates a support formed of insulating material and suitably secured to the arm 102'. The bottom face of the support 112 has secured to it spaced contact or conductor elements 113, 113', electrically connected by leads 114, 114', to the coils 25, respectively (see Fig. 25). As shown in Fig. 17, the conductor elements 113, 113', are spaced at their inner ends, to prevent engagement of the contact 110'' therewith when the arm 110 is in normal position and extend in curvilinear directions laterally concentric to the axis of the rod 106, so that when the arm 110 is swung in either direction the contact 110'' thereon will engage one of the conductor elements 113, 113', and connect the adjacent coil 25 in the main circuit 25x.

The main circuit 25x is traced as follows: from the negative side of battery 26, lead 47', lead 47'', contact 39 and contact 38', lead 110a, contact 110'', conductor elements 113, 113', leads 114, 114', connected to the respective coils 25, leads 25a from the coils connected to the movable contact of the normally closed switch 51 (later referred to) and lead 25a' connected to the positive side of the battery 26.

From the foregoing description it will be observed that in each movement of the lever 22a, the arm 110 will be operated in one direction to close the circuit through one of the coils 25 and upon seating of the trigger 38 in any selected notch 28a', thereby closing the main circuit 25x, the core 27 will be operated in one direction to open the valve 17 to supply fluid under high pressure to one end of the cylinder 14a. It will be also observed that the trigger 38 will maintain the main circuit 25x open during movement of the lever 22a in either direction, notwithstanding the simultaneous movement of the contact 110'' on the arm 110 into engagement with one of the conductor elements 113, 113'. Upon movement of the adjacent flap 6' to the position determined by the indexing mechanism 22, the coil 109 will be energized in the manner later set forth, due to operation of the release means 21', to release the arm 110 from the clutch 105 on sleeve 104, whereby under the influence of the spring 111 the arm 110 will return to its normal position ready for a succeeding operation and open the main circuit 25x. As shown, the gear train 101a—103—103' provides a reduced ratio of movement of the arm 110 with respect to that of the lever 22a for obvious reasons, since sufficient movement of the arm is only required to effect engagement of its contact 110'' with one of the conductor elements 113, 113'.

Upon operation of the valve release means 21', as later set forth, and opening of the main circuit 25x, the spring 19 automatically returns the valve element 17' to closed position and the core 27 moves to its normal position. In any succeeding operation of the lever 22a the valve element will be moved to either open position dependent upon the direction of movement of the lever 22a.

The valve releasing means 21' comprise the following (see Figs. 3, 3c, 3d, 4 and 5): 57 indicates as an entirety a follower carrying the contact device 46 and operatively connected to the adjacent flap 6' for movement therewith in opposite directions, whereby the contact 46 is moved into engagement with the operated core 23x' of that solenoid 23x corresponding to the contact 45 through which the circuit 44' has been completed in operation of the lever 22a to a selected indexing position. The follower 57 preferably consists of a tubular member 58, slidably supported in the outer side wall 23a and a bracket 23a'' supported thereby, and a connector 59 pivotally and slidably connected at its inner end to the inner end of the tubular member 58 and pivotally connected at its outer end through a link 59a to the flap 6', the connector being preferably hinged intermediate its ends on a bracket fixed to the side wall 10a. The tubular member 58 telescopes over the inner portion of the rod 46', which is formed of conducting material, and rigidly supported on, but electrically insulated from the adjacent side wall 23a (see Fig. 3c), the rod 46' forming part of a separate circuit 60'. As shown, the outer end portion of the rod 46' is provided with screw threads to take nuts 61 which are tightened against the opposite sides of the adjacent side wall 23a to rigidly connect the rod to the latter. The inner wall of the tubular member 58 is lined with suitable insulating material to insulate it from the rod 46'. The contact 46 is shaped to surround the tubular member 58 (see Fig. 3d) and on its upper side it is formed with a slot 46a' in which is mounted a steel roller 46b arranged to roll on the rod 46', the roller being loosely mounted on a steel shaft 46c which is mounted at its opposite ends in the side walls of the slot 46a'. The end portions of the shaft are provided with flats, which are engaged by springs held under compression by screw plugs 46c' threaded in openings formed in the top side of the contact 46. As shown, the contact device 46 is insulated from the tubular member 58 by a section of insulating material 62 and the opposite sides of the roller 46b are provided with insulating material to insulate it from the tubular member 58, whereby the current flow is through contact 46, shaft 46c, roller 46b, to the rod 46'. It will be understood that the cylinder 14a is of a length to provide a piston stroke long enough to swing the flap 6' from one extreme position to its other extreme position and that the connection of the rod 59 with the flap relative to the pivot 12 is related to the travel of the contact 46 from zero position in either direction to stop the flap at either of its extreme limits of swinging movement or at any predetermined intermediate indexing position.

The circuit 60' is traced as follows: lead 60a connected to the positive side of the battery 26, coil of the solenoid 51a (later referred to), which may be of any desired construction, bus bar 60b, leads 60c from the bus bar to the cores 23x' of the solenoids 23x, respectively, contact 46, rod 46' and lead 60d which is connected to the negative side of the battery 26.

The movement of the flap 6' serves to move the contact 46 into engagement with the elevated core 23x' (see Fig. 3), the effect of which is to close the separate circuit 60', thereby energizing the coil of the solenoid 51a which opens the switch 51 (which is normally held closed by a spring, as later set forth) to break the main circuit 25x.

It will be noted that the operating means 21 and the indexing mechanism 22 in co-operation with the automatic release means 21', which permit the return of the valve element 17' to closed position under the influence of the spring 19, operate to move the flap 6' from normal position into any predetermined angle relative to the wing 6 in either direction and back to normal position, or from any predetermined angle to another predetermined angle or from any angular position at one side of the normal position of the flap 6' to any angular position at the opposite side of its normal position, these ranges of operation being possible due to the fact that upon completion of each operation to move the flap 6' to a predetermined position, the valve 17 closes, the circuit through the coil 25 (which was energized in effecting such operation) is broken and the succeeding operation of the lever 22a serves to connect in the main circuit either coil 25 dependent upon the direction of movement thereof.

It will be observed that in operating the lever of the indexing mechanism 22 to a predetermined position the secondary circuit 44' is closed for the purpose of energizing the coil of the solenoid 23x in that circuit corresponding to the contact 45 selected for engagement and this solenoid in turn operates the adjacent core 23x' to raise the latter in position for engagement by the movable contact 46; also upon engagement of the contact 46 with the operated core 23x', the separate circuit 60' is closed. The movable contact of switch 51 is connected to the core 51c of the solenoid 51a, the coil of which is connected in series in the separate circuit 60' (as already set forth), so that when this circuit is closed the solenoid operates to break the main circuit 25x through the switch 51 to de-energize the previously energized coil 25 of the solenoid 24.

The switch devices 145 are mounted in a housing 145' suitably fixed to the side wall of the casing for the valve 17 opposite to the arms 20, 20a (see Fig. 4) and comprise the following: 145a indicates a disk fixed to but insulated from the inner face of the end wall of the housing 145' and provided with (a) pairs of contacts 145b disposed equal distances from the axis of the shank of the valve element 17', each pair of contacts being spaced equal distances from an imaginary vertical plane cutting said axis, as viewed in Fig. 24 and (b) pairs of contacts 145c similarly related to said axis but spaced from said axis on radii less than that of the contacts 145b. The contacts 145b of each pair thereof are connected by a lead 145b' and one contact 145b of each pair is connected to the lead 60d, whereas the contacts 145c of each pair thereof are connected by a lead 145c' and one contact 145c of each pair is connected to the lead 47'. 146 indicates a disk fixed to and rotatable with the shank 17'' of the valve element 17' (see Fig. 20) in opposed relation to the disk 145a and provided with a pair of spaced contacts 147 connected by a lead 147' and a pair of spaced contacts 148 connected by a lead 148'. As shown, the contacts 147, 148, are mounted on an imaginary diameter of the disk 146, the contacts 147 being disposed on radii equal to that of the contacts 145b and the contacts 148 being disposed on radii equal to that of the contacts 145c. The contacts 147, 148, are positioned on the disk 146 so that when the valve 17 is moved to closed position the contacts 147, 148, will be positioned between the contacts 145b, 145c (see Fig. 21), and hence effect opening of the circuits 44' and 60', but when the valve element 17' is operated to either open position (see Figs. 22 and 23), the contacts 147 will engage the opposite related contacts 145b and the contacts 148 will engage the opposite related contacts 145c to close the circuits 44' and 60'. It will therefore be seen that when the valve element 17' moves to closed position, the separate circuit 60', as well as the circuit 44', is broken, to eliminate drain on the battery 26.

200 indicates as an entirety means controlled by the solenoid 51a for automatically disconnecting the arm 110 of the make-and-break means 100 from the sleeve 104, whereby the arm is moved to its normal position under the influence of the spring 111, and for re-establishing the main circuit 25x through the normally closed switch 51. Of the disconnecting means 200, 200a indicates a switch the movable contact of which is connected to the core of the solenoid 51a (see Figs. 3 and 3e) so that when the coil thereof is de-energized the switch 200a is open and when this coil is energized to open the switch 51 and break the main circuit 25x the switch 200a is closed to close in auxiliary circuit 200'. The circuit 200' is traced as follows: lead 47', contacts of switch 200a, lead 109b, coil of solenoid 109 and lead 109a connected to lead 44a. It will thus be seen that when the separate circuit 60' of the release means 21' is closed, the switch 51 will be opened to break the main circuit 25x and the previously energized coil 25 will be de-energized, whereupon the spring 19 will close the valve 17 and move the core 27 to its normal position simultaneously breaking the circuits 44' and 60', and the solenoid 109 will operate the core 106 and disconnect the arm 110 from the sleeve 104, whereupon the arm will swing to normal position ready for a succeeding operation and also break the main circuit 25x through the contact 110'' and one of the conductor elements 113, 113'.

The solenoid 51a is mounted in a suitable case 51' removably mounted in any desired position, for example, on top of the cylinder 14a (see Fig. 3). The solenoid consists of a coil 51'' suitably secured to the base, which is formed of insulation material, for the case 51' and a core 51c (formed of iron or steel) provided at one end with one contact of the switch 51 and at its opposite end one contact of the switch 200a, these contacts being suitably insulated from the core. The end portion of the core 51c adjacent to the switch 51 is provided with a collar 51c' between which and the adjacent end wall of the coil 51'' is a coiled spring 51d normally tending to move the core endwise (toward the right as viewed in Figs. 3 and 3e) to maintain the switch 51 normally closed, so long as the coil 51'' is de-energized. In this arrangement, when the coil 51'' is energized, the core 51c will be moved toward the left, the effect of which is to open the switch 51 and close the switch 200a, whereby the main circuit 25x is broken and the auxiliary circuit 200' is closed.

Operation: Assuming that the lever 22a is in neutral position and the airplane pilot wishes to swing the flap 6' downwardly to the first predetermined inclined position: the plunger 37 is pressed downwardly to release the trigger 38 from "0" notch 28a', which breaks the main circuit 25x between the contact 38' and contact 39, and then the lever 22a is moved toward the left (as viewed in Fig. 7) and the plunger released to set the trigger in notch 28a' designated "1." This operation has (a) operated the arm 110 counterclockwise to engage contact 113" thereon with the conductor element 113', thereby closing the main circuit through the leads connected to the coil 25 (at the left as viewed in Fig. 3), (b) broken the main circuit 25x through the contact 38' and contact 39 and the secondary circuit 44' through the annulus 44 and contact 45 for the "0" position and upon seating of the trigger 38 in indexing notch "1," (c) re-established the main circuit 25x through the contact 38' and contact 39, and (d) re-established the circuit 44' through the annulus 44 and contact 45 for the latter indexing position; so that the coil of the solenoid 23x corresponding to indexing notch "1" has been energized, the effect of which is to raise the core 23x' of the solenoid in position to be engaged by the contact 46 (see Fig. 3) and (e) opened the valve 17 to admit the fluid under high pressure from pipe 18 to the outer end of the cylinder 14a and connect the inner end of the cylinder to the pipe 18a to permit discharge of the fluid from the cylinder into and through the latter pipe, due to the increased fluid pressure supplied from the pipe 18, as shown in Fig. 3, which shows the core 27 in operated position and the piston 14 at starting position to move outwardly to swing the flap 6' to the selected predetermined position. As the piston 14 moves outwardly (toward the right as viewed in Fig. 3) the contact 46 will engage the elevated core 23x' and close the separate circuit 60', the effect of which is to energize the coil of solenoid 51a and as the movable contacts of switches 51, 200a, are carried by or connected to core of the solenoid 51a, (a) the switch 51 will be opened to break the main circuit 25x, thereby de-energizing the coil 25 of solenoid 24 and permitting spring 19 to return the valve element 17' of valve 17 to closed position (see Fig. 3a) and the core 27 to its neutral position and (b) the switch 200a will be closed, thereby energizing the coil 109 and releasing the arm 110 from the sleeve 104 to permit the arm to swing to neutral position. As the closing of the valve 17 shuts off the fluid connections to and from the opposite ends of the cylinder 14a, the piston will be positively held against movement in either direction and thus lock the flap 6' in its operated or adjusted position. By reason of the return of the arm 110 and core 27 to neutral position and the valve 17 to closed position following the adjustment of the flap in any predetermined position, the lever 22a of the indexing mechanism 22 may be moved to neutral position or to any desired indexing position to operate the flap 6' to the selected position.

Provision is made for detachably connecting the levers 22a together whereby both flaps 6' may be operated as a unit as the result of a single manual operation. For this purpose the grips 42b are provided with inwardly extending, alined hollow members 42b" in one of which is mounted a bolt 63 movable endwise into the other member, the wall of the bolt carrying member having an offset recess 63a and the bolt having a pin 64 slidable in the slot and arranged, when the bolt is rotated to move into into the off-set recess 63a and lock the bolt 63 in extended position with the two members 42b" detachably connected together. By retracting the bolt 63, the members 42b" are detached to permit movement of the levers 22a independently.

In the construction and arrangement shown in Figs. 1 to 16, inclusive, provision is made for swinging the flaps 6' (a) from normal position upwardly to an extreme position designated "C" and two intermediate positions designated "A" and "B" and (b) from normal position downwardly to an extreme position designated "6" and five intermediate positions designated "1" to "5," respectively, as will be understood from the indicia shown in Fig. 9; it being observed that when the levers 22a are swung in the same direction about the shaft 28' both flaps 6' will be swung in the same direction.

The means herein disclosed may be employed to operate the movable members of an airplane which are to be moved simultaneously but in opposite directions, for example, the ailerons 7, as shown in Fig. 1. In this arrangement the connections of the branch leads to the coils 25 of the solenoid 24 for one operating means 21 are reversed with respect to the connections of the branch leads to the coils 25 of the other operating means 21. As shown in Fig. 1, the ailerons 7 are connected to power means 14x (shown in dotted lines) each consisting of a cylinder and a piston therein connected to the adjacent aileron, adapted to be operated and controlled by means similar to that already described and shown in Figs. 1 to 16, inclusive, except that the branch leads for the coils 25 are connected as above set forth, so that when the levers 22z (see Fig. 14) are moved together in the same direction, one aileron 7 swings upwardly and the other aileron 7 swings downwardly. The indexing means 21x for these means provide for operation of the ailerons equal distances upwardly and downwardly, as shown in Fig. 14.

From the foregoing description it will be observed that adjustment of either flap 6' to any predetermined position and from such position to neutral or another predetermined position is effected merely by the operation of one of the levers 22a, the devices which control the circuits being operable automatically to swing the flap to and lock it in any selected position and following the movement of the flap 6' to any position these devices assume their normal position ready for a succeeding operation to move the flap to a different position; also, by providing in the main circuit 25x a cut-out (contact 38' and contact 39) which can only be closed by the final seating of the trigger 38 in one of the notches 28a', the lever 22a may be moved about its axis in either direction any desired distance without danger of effecting movement of the flap 6', this arrangement being important as the pilot in moving the lever into registry with any selected notch may release the trigger before such registry takes place or swing the lever beyond the selected notch, but in either event the devices will not be operated since the trigger is ineffective to close the circuit 25x until it is seated in the notch.

In my construction, I provide a pair of related levers for the flaps and a pair of related levers for the ailerons, each pair of related levers being provided with detachable connections between them, whereby either lever of each pair may be operated independently of the other adjacent lever. Accordingly, both flaps may be simultaneously moved upwardly or downwardly, whereas the ailerons may be moved simultaneously in opposite directions, but by providing separate levers for the flaps and separate levers for the ailerons, either flap may be operated independently of the other flap or the flaps operated in opposite directions or one aileron operated separately or differently relative to the other aileron. In these arrangements it will be seen that the pilot may operate the flaps and ailerons to meet abnormal conditions. For example, in taking off and before altitude is reached the pilot finds that his forward speed is reduced and one wing starts to drop into a bank and the airplane turns, the pilot may swing the aileron on the other wing up to its extreme position and adjust the aileron on the dropping wing to meet the existing condition and thus right the plane and avoid a burble on the dropped wing; or assume that one wing (the right wing) has been damaged or partly broken off, so that it has lost a large portion of its lift. In this abnormal condition, the flap on the right wing can be lowered and the flap on the left wing raised to right the airplane, at least sufficiently to make a safe landing.

It will thus be understood that the flaps may be operated to meet various abnormal conditions, in addition to their operation in making landings and that the ailerons may be variously controlled under abnormal conditions, as well as supplement the operation of the movement of the flaps in an emergency to avoid possible damage.

This control arrangement of the flaps and/or aileron may also be advantageous where landing takes place on one landing gear due to the damaged condition of the other landing gear.

It will be observed from the foregoing description that where an apparatus is provided with two or more controlling or movable parts each operated by an operating means as herein disclosed, and one of the parts becomes inoperative or ineffective, wholly or partially, the other part may be operated to full advantage to compensate for the inoperative part.

As shown in Fig. 7a, I provide a pair of levers 22z' which may be operatively connected to other movable parts of the airplane, such as the elevators, landing gears or the rudders, and operated and controlled in the manner already set forth in connection with the flaps 6'.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In an airplane having a swingable member arranged to control the flight or maneuvering thereof, the combination of fluid operated means comprising a cylinder, a piston therein connected to said member, fluid supply and discharge connections for each end of said cylinder, fluid supply and discharge means, a valve between said fluid supply and discharge means and said connections and a spring normally tending to close said valve to cut off the flow of fluid to and from said cylinder but arranged when moved in either direction to permit fluid supply to one end of the cylinder and discharge of fluid from its opposite end, an operating device movable to selected positions, means for moving said valve to either open position against the tension of said spring upon movement of said device to any selected position, elements between said device and said moving means operated by said device for making said moving means operative to move said valve, and an indexing mechanism having a series of movable elements arranged to be selectively pre-set by said device co-ordinately with the operated position thereof and an element moved by said member for engaging the pre-set element, operatable independently of said device to make said valve moving means in-operative, when said member moves to the selected position, whereby said valve is closed by said spring.

2. In an airplane having a swingable member arranged to control the flight or maneuvering thereof, the combination of hydraulically operated means comprising a cylinder, a piston therein connected to said member, liquid supply and discharge connections for each end of said cylinder, liquid supply and discharge means, a valve between said liquid supply and discharge means and said connections, a spring normally tending to close said valve to cut off the flow of liquid to and from said cylinder but arranged when moved in either direction to permit liquid supply to one end of the cylinder and discharge of liquid from its opposite end, a double acting solenoid the core of which is operatively connected to said valve to move it in either direction into open position, a circuit including a source of electrical energy, a switch arranged to alternately close the circuit through the coils of said solenoid and a separate normally closed switch in said circuit, a series of movable contacts one for each operating position of said member, each contact being connected to one side of said source of electrical energy, a lever operatively connected to said first mentioned switch and arranged when operated in either direction to close said circuit through one coil of said solenoid, indexing mechanism controlled by the movement of said lever to any selected position to operate one of said contacts, a follower connected to and operated by said member, connected to the opposite side of said source of electrical energy and arranged to engage said operated contact and close a separate circuit, and electrical means in said separate circuit for operating said separate switch to break the circuit through the energized coil of said solenoid, whereby said valve is released for movement to closed position by said spring.

3. In an airplane having a swingable member arranged to control the flight or maneuvering thereof, the combination of hydraulically operated means for swinging said member from normal to an operating position, said means including a cylinder, a piston therein operatively connected with said member, liquid supply and discharge connections for each end of said cylinder, liquid pressure supply and discharge means, a valve between said supply and discharge means and said connections arranged when moved in either direction to simultaneously connect said liquid supply means with the liquid connection for either end of said cylinder and the discharge connections with the opposite end of said cylinder, and means for controlling the operation of said valve, comprising a spring normally tending to close said valve, a source of electrical energy, a double acting solenoid the core of which is operatively connected to said valve for moving it in either direction to open position, a circuit for the coils of said solenoid connected to said source of electrical energy, a switch for closing the circuit through either coil of said solenoid, a separate normally closed switch in said circuit, a lever arranged when moved in either direction to operate said first mentioned switch to close said circuit, an indexing mechanism comprising a plurality of contacts, one for each predetermined position of said member, connected to one side of said source of electrical energy, a contact connected to the other side of said source of energy and operatively connected to said lever for movement thereby into engagement with any selected one of said first mentioned contacts, to close a separate circuit therethrough, a separate solenoid connected in series in each of said separate circuits, a spring operated core for each separate solenoid arranged to be operated in opposition to its spring when the coil of the solenoid is energized, the cores of said separate solenoids being electrically connected to one side of said source of electrical energy, a follower electrically connected to the other side of said source of current and operatively connected to and operated by said member for engagement with the operated core, to close a supplemental circuit therethrough, and electrical means controlled by each said supplemental circuit for operating said separate switch to break said first mentioned circuit, whereby said valve is operated to closed position by said spring.

4. In an airplane having a movable member for controlling the flight or maneuvering thereof, the combination of power means for operating said member in opposite directions, electrical means for controlling said power means to move said member to predetermined positions in either direction, said electrical means including a lever movably mounted on said airplane to move in opposite directions, a source of electrical energy, a main circuit, a normally closed switch in said circuit, switch devices carried by said lever in in-operative relation during movement thereof but operable upon movement of said lever to any selected position, a separate switch controlled by the movement of said lever and operable from a mid position in either direction to connect in said main circuit to operate said power means in a direction co-ordinated with the direction of movement of said lever, a contact on said lever electrically connected to one side of said source of energy, a plurality of separate contacts on said lever electrically connected to the opposite side of said source of electrical energy, a member rotatably mounted on said lever and provided with a contact member arranged to electrically connect said first mentioned contact with any one of said separate contacts, gearing between a portion of said airplane and said rotatable member for rotating the latter during movement of said lever to close a circuit through the contacts engaged by said contact member, and electrical means controlled by the last mentioned circuit and said member for breaking said main circuit through said normally closed switch and said separate switch and returning said separate switch to mid position independently of said lever.

5. In an airplane having a pivoted member swingable relative to a normal operating position in opposite directions to selectable operating positions, the combination of power means for moving the member in either direction from one position to another position, control means for setting said power means in operation, said control means including a pair of spaced elements and a movably mounted contactor normally disengaged from said elements but arranged to engage either thereof to control the direction of movement of said power means, an indexing mechanism having a series of devices each movable to an operative position, a swingably mounted lever, gearing carried by said lever and having meshing engagement with a fixed portion of the airplane, whereby said gearing is driven by the movement of said lever to operate said contactor, separate gearing carried by said lever and having meshing engagement with a fixed portion of the airplane, whereby said gearing is driven by the movement of said lever, means controlled by the range of rotative movement of said separate gearing for operating one of said devices in advance of the movement of the member, and means controlled by the member upon movement thereof to the selected position and the operated device for disengaging said contactor from one of said elements.

6. In an airplane, having a member movable from normal to different operating positions at opposite sides of its normal position, a manually operable device, indexing means having a plurality of separately movable elements operable for preselecting any predetermined operated position of said member, one of said elements being operated by said device in each operation thereof, electrical means controlled by said device for setting said power means in operation for moving said member from any position to the preselected operated position in either direction, and separate electrical means controlled by said member when moved to the preselected position and said operated element for making the first mentioned electrical means ineffective independently of said operable device.

7. In an airplane having a movable member, the combination of power mechanism for operating said member in either direction, a device movable from normal position in either direction for setting said power mechanism in operation, a contact operatively connected to and moved by said member, and electrical means for controlling said device, said means including a source of electric current supply, a main circuit and secondary circuits connected to said current supply source, separate circuits connected to said current supply source and each arranged to be controlled by one of said secondary circuits and closed by said contact, a double acting solenoid having coils each arranged to be connected in said main circuit, the core for said solenoid being operatively connected to said movable device, a make-and-break mechanism for connecting either one of said solenoid coils in said main circuit, indexing mechanism for selectively closing each of said secondary circuits, a lever for operating said make-and-break mechanism and said indexing mechanism, a normally closed switch in said main circuit, and an electrical device controlled by the closing of each separate circuit for opening said normally closed switch.

8. The arrangement as claimed in claim 7 wherein is provided a switch in said main circuit arranged to be opened during movement of said lever.

9. The arrangement as claimed in claim 7 wherein is provided switch devices operated by said movable device for closing and opening certain of said circuits.

10. The arrangement as claimed in claim 7 wherein are provided means controlled by said electric device for disconnecting said main circuit through said make-and-break mechanism.

11. In an airplane having a movable member, the combination of power mechanism for operating said member in either direction, a device movable from normal position in either direction for setting said power mechanism in operation, a contact operatively connected to and moved by said member, and electrical means for controlling said device, said means including a source of electric current supply, a main circuit and secondary circuits connected to said current supply source, separate circuits connected to said current supply source and each arranged to be controlled by one of said secondary circuits and closed by said contact, a double acting solenoid having coils each arranged to be connected in said main circuit, the core for said solenoid being operatively connected to said movable device, a make-and-break mechanism in said main circuit having a movable element arranged to connect either one of said solenoid coils in said main circuit, indexing mechanism for selectively closing each of said secondary circuits, a lever, operating connections between said lever and the movable element of said make-and-break mechanism and said indexing mechanism for operating said mechanisms, a normally closed switch in said main circuit, and an electrical device controlled by the closing of each separate circuit for opening said normally closed switch, means controlled by said electrical device for disconnecting the movable element of said make-and-break mechanism from said lever, and springs connected to said movable device and said movable element for returning them to normal position upon opening of said normally closed switch.

12. In an airplane having a movable member, the combination of power mechanism for moving said member, a manually operated device, an indexing member having a series of selective contacts corresponding to predetermined positions of said member and arranged to be operated by said device to a selective position to engage one of said contacts, a separate device operatively connected to and arranged to be moved by said member, electrical means, controlled by said manually operated device, for setting said power mechanism in operation, said electrical means including a source of current supply and a main circuit having a normally closed switch, and electrical means consisting of separate movable contacts, means for operating each of said movable contacts into the path of movement of said separate device, a circuit connected to said source of current supply, between each of said first mentioned contacts and one of said operating means arranged to be closed by the operation of said indexing member to a selective position and means controlled by the engagement of said separate device with the operated movable contact for operating said switch to open position to make said first mentioned electrical means ineffective upon movement of said member to the position corresponding to the selective position of said indexing member.

13. In an airplane having a member swingable from a normal position to predetermined operating positions, fluid operated means for swinging said member, electrical means for controlling said swingable member, electrical means for controlling said swinging means, said control means including a source of electrical energy, a contact connected to and operated by said member, an indexing mechanism comprising a plurality of circuits connected to said source of energy and a movable element arranged to close one of said circuits when operated to a predetermined position, a solenoid connected in series in each of said circuits and arranged when its coil is energized to operate the core of the solenoid into the path of movement of said device, a main circuit connected to said source of electrical energy, a switch in said main circuit, a manually operated device for closing said main circuit, electrically operated means in said main circuit for setting said swinging means in operation, upon closing of said main circuit and electrical means, including a separate circuit for each of said first mentioned circuits, arranged to be closed by the engagement of said contact with the operated core of the solenoid energized by the closing of one of the first mentioned circuits, for operating said switch to open said main circuit.

14. In mechanism having a movable member, a source of current supply, a circuit connected to said source of supply, a contact movable with said member in said circuit, electrical power means connected to said source of supply for operating said member to and from predetermined positions, a manually operable device, an indexing mechanism having a series of contacts each connected in the circuit for said first mentioned contact and separately operable into position for engagement by said first mentioned contact to selectively limit the movement of said member from one position to another position in either direction, means operated by said device for setting said power means in operation, separate means controlled by said device for selectively operating one of said last mentioned contacts, and separate means responsive to the engagement of said first mentioned contact with the operated last mentioned contact to open the circuit for said power means, whereby said member is stopped at the selected indexed position.

15. In an apparatus having movable member, the combination of fluid operated means for operating said member in either direction, a valve for controlling the supply fluid under pressure to said means and discharge of the fluid therefrom, the valve element for said valve being operable from closed position in either direction to open position to control the flow of the fluid to and from said means, a double acting solenoid having a core connected to said valve element, a spring normally maintaining said valve element in closed position and said core centrally of the coils of said solenoid, a source of electric energy, a main circuit connected to one side of said energy supply source and having a normally closed switch and branch circuits for said coils between said main circuit and the other side of said energy supply source and each having a normally open switch, a lever, means operated by said lever for closing one of said normally open switches when the lever is operated in either direction, whereby one of the coils is energized to effect movement of said core and operation of said valve element to open position, and electrical means for opening said normally closed switch when the movable member moves to the selected predetermined position, whereby said spring operates to close the valve element and move said core to its central position, independently of the position of the movable member and said fluid operated means, said electrical means including a series of movable contacts each forming the terminal of a lead connected to one side of said source of electrical energy and selectively operated by the movement of said lever and a contactor movable with the movable member and connected to the other side of said source of energy supply and arranged to engage the operated contact and close the circuit for said electrical means.

16. An apparatus as claimed in claim 15 wherein means responsive to the opening of said normally closed switch are provided for restoring the normally open switch to open position.

EDWARD E. WALLACE.

REFERENCES CITED

The following references are of record in the file of this patent:

UNITED STATES PATENTS

| Number | Name | Date |
|---|---|---|
| 561,271 | Ongley | June 2, 1896 |
| 844,090 | Bijur | Feb. 12, 1907 |
| 1,379,895 | Aveline | May 31, 1921 |
| 1,683,175 | Falcke | Sept. 4, 1928 |
| 1,841,629 | Pigeolet | Jan. 19, 1932 |
| 1,880,019 | Harper | Sept. 27, 1932 |
| 2,030,986 | Havill | Feb. 18, 1936 |
| 2,031,177 | Northrop | Feb. 18, 1936 |
| 2,152,021 | Baumer | Mar. 28, 1939 |
| 2,162,150 | Wolf | June 13, 1939 |
| 2,188,834 | Fischel et al. | Jan. 30, 1940 |
| 2,226,821 | Kempson | Dec. 31, 1940 |
| 2,262,173 | Fischer | Nov. 11, 1941 |
| 2,290,479 | Mercier | July 21, 1942 |

FOREIGN PATENTS

| Number | Country | Date |
|---|---|---|
| 192,540 | Great Britain | Feb. 8, 1923 |
| 225,903 | Great Britain | Dec. 8, 1924 |
| 516,720 | Great Britain | Jan. 10, 1940 |
| 711,002 | France | June 16, 1931 |
| 273,033 | Germany | Apr. 17, 1914 |
| 516,125 | Germany | Jan. 19, 1931 |
| 4,727 | Netherlands | Jan. 13 1920 |